United States Patent
Bahr et al.

(10) Patent No.: US 7,765,271 B1
(45) Date of Patent: Jul. 27, 2010

(54) SYSTEM AND METHOD FOR SCANNING A DOCUMENT IN CLIENT/SERVER ENVIRONMENT

(75) Inventors: David L. Bahr, Suwanee, GA (US); Douglas W. Bahr, Marietta, GA (US); Meenal V. Ekbote, Atlanta, GA (US); Alexandre Okonechnikov, Marietta, GA (US)

(73) Assignee: Hyland Software, Inc., Westlake, OH (US)

( * ) Notice: Subject to any disclaimer, the term of this patent is extended or adjusted under 35 U.S.C. 154(b) by 1463 days.

(21) Appl. No.: 09/497,383

(22) Filed: Feb. 3, 2000

(51) Int. Cl.
G06F 15/16 (2006.01)
G06F 3/12 (2006.01)
G06F 17/00 (2006.01)
G06F 3/00 (2006.01)
H04N 1/04 (2006.01)

(52) U.S. Cl. .................. 709/217; 358/1.15; 358/474; 715/234; 715/760

(58) Field of Classification Search ............. 709/201, 709/217, 232; 358/442, 468, 474, 1.15; 345/760, 817–820, 767, 802; 715/501.1, 715/513
See application file for complete search history.

(56) References Cited

U.S. PATENT DOCUMENTS

| 5,486,686 | A | * | 1/1996 | Zdybel et al. | 235/375 |
| 5,666,490 | A | * | 9/1997 | Gillings et al. | 709/238 |
| 5,671,282 | A | * | 9/1997 | Wolff et al. | 713/179 |
| 5,720,013 | A | | 2/1998 | Uda et al. | |
| 5,761,662 | A | | 6/1998 | Dasan | 707/10 |
| 5,790,793 | A | | 8/1998 | Higley | 395/200.48 |
| 5,802,299 | A | | 9/1998 | Logan et al. | 395/200.48 |
| 5,812,134 | A | | 9/1998 | Pooser et al. | 345/356 |
| 5,819,092 | A | * | 10/1998 | Ferguson et al. | 717/113 |
| 5,819,301 | A | | 10/1998 | Rowe et al. | 707/513 |
| 5,903,901 | A | | 5/1999 | Kawakura et al. | 707/501 |
| 5,911,044 | A | | 6/1999 | Lo et al. | |

(Continued)

FOREIGN PATENT DOCUMENTS

EP       0 748 107 A2     12/1996

(Continued)

OTHER PUBLICATIONS

GNOME Ltd. "Java Twain Package Version 3.0", originally posted Nov. 2, 1999, retrieved from <http://web.archive.org/web/19991102235823/http://www.gnome.sk>.*

(Continued)

Primary Examiner—George C Neurauter, Jr.

(57) ABSTRACT

The invention includes generating a start scan signal at a user interface of a client device, transmitting the start scan signal from the client device to a scanner, receiving the start scan signal at the scanner, and scanning a document with the scanner to generate document data, in response to the start scan signal. The user interface can include a web browser and the start scan signal can be generated by activation of a control element defined in a hypertext mark-up language (HTML) document displayed on the web browser. The method can also include transmitting the document data from the scanner to the client device, receiving the document data at the client device, and generating a display including the scanned document on the user interface of the client device, based on the document data. The display can be generated from a hypertext mark-up language (HTML) document.

71 Claims, 7 Drawing Sheets

U.S. PATENT DOCUMENTS

| | | | |
|---|---|---|---|
| 5,913,210 A | 6/1999 | Call | 707/4 |
| 5,925,106 A | 7/1999 | Nielsen | 709/247 |
| 5,983,268 A | 11/1999 | Freivald | 709/218 |
| 5,991,760 A | 11/1999 | Gauvin et al. | 707/10 |
| 6,009,442 A * | 12/1999 | Chen et al. | 707/522 |
| 6,035,323 A * | 3/2000 | Narayen et al. | 709/201 |
| 6,101,509 A * | 8/2000 | Hanson et al. | 707/513 |
| 6,121,970 A * | 9/2000 | Guedalia | 345/760 |
| 6,145,014 A * | 11/2000 | Chong | 709/328 |
| 6,209,048 B1 * | 3/2001 | Wolff | 710/62 |
| 6,266,623 B1 * | 7/2001 | Vock et al. | 702/44 |
| 6,286,054 B2 * | 9/2001 | Wang | 709/321 |
| 6,330,572 B1 * | 12/2001 | Sitka | 707/205 |
| 6,356,283 B1 * | 3/2002 | Guedalia | 345/760 |
| 6,373,507 B1 * | 4/2002 | Camara et al. | 345/825 |
| 6,415,278 B1 * | 7/2002 | Sweet et al. | 707/2 |
| 6,424,996 B1 * | 7/2002 | Killcommons et al. | 709/206 |
| 6,429,952 B1 * | 8/2002 | Olbricht | 358/442 |
| 6,453,127 B2 * | 9/2002 | Wood et al. | 399/8 |
| 6,473,788 B1 * | 10/2002 | Kim et al. | 709/209 |
| 6,480,304 B1 * | 11/2002 | Os et al. | 358/474 |
| 6,567,121 B1 * | 5/2003 | Kuno | 348/211.3 |
| 6,587,129 B1 * | 7/2003 | Lavendel et al. | 345/776 |
| 6,633,913 B1 * | 10/2003 | Chalstrom et al. | 709/226 |

FOREIGN PATENT DOCUMENTS

| | | |
|---|---|---|
| EP | 03233243 | 5/1997 |
| EP | 0 878 951 A1 | 11/1998 |
| GB | 2 286 944 A | 3/1995 |
| WO | WO 97/07468 | 2/1997 |
| WO | WO 98/38761 | 3/1998 |
| WO | WO 98/19478 | 7/1998 |
| WO | WO 9934304 | 7/1999 |

OTHER PUBLICATIONS

Helge Hackbarth. "TIFFY View—Java Edition", originally posted Sep. 22, 1999, retrieved from <http://web.archive.org/web/19990922044105/www.tiffy.de/tiffye/Tiffy.html>.*

Sun Microsystems, Inc. "Frequently Asked Questions—Java Advanced Imaging API", originally posted Oct. 2, 1999, retrieved from <http://web.archive.org/web/19991002161607/java.sun.com/products/java-media/jai/index.html>.*

Lead Technologies, Inc. "LEADTOOLS", originally posted Dec. 6, 1998, retrieved from http://web.archive.org/web/19981206103323/www.leadtools.com/products.htm.*

IBM Corporation. "Extendable Model for Toggle Button", IBM Technical Disclosure Bulletin, vol. 37, Issue 2A, pp. 33-34, Feb. 1, 1994.*

Prevalent Software, Inc. "Quillix Data Sheet", 2 pages.*

Prevalent Software, Inc. "Quillix White Paper", 7 pages.*

Lantham, Robert C. "Automating the Enterprise & and Internet", presented at the Optika International Summit on Jan. 18, 2000, 31 pages.*

Main, Ian and Gale, Tony. "GTK 1.0 Tutorial", section 6 "The Button Widget", released Sep. 2, 1998, <gtk.org/tutorial1.0/>, 5 pages.*

Mediamacros, Inc. "Toggle Button", published Jun. 7, 1999, <www.mediamacros.com/item/item-928764763/>, 3 pages.*

Prevalent Software, Inc. "Prevalent Software Inc. Introduces Quillix", publicly released Jan. 18, 2000, <www.prevasoft.com/press011800.shtml>, 1 page.*

Patent Cooperation Treaty, Written Opinion, Dec. 4, 2001, International Application No. PCT/US01/03579, filed Feb. 2, 2001 by Applicant InterTech Information Management, Inc.

IPEA International Preliminary Examination Report for PCT app. PCT/US01/03579 completed Apr. 4, 2002.

Prevalent Software, Inc., "Prevalent Software, Inc. Introduces Quillix; Quillix is a Revolutionary New Browser Based, Distributed Capture Solution For The Internet," Jan. 18, 2000, pp. 1-3, Colorado Springs, CO.

KOFAX, "Ascent Capture Internet Server, Distributed Production Document and Data Capture Version 3.0", Release Notes, Jan. 20, 2000, 12 pages.

http://web.archive.org/web/20000610143436/www.kofax.com/new/2000-01-31-productoftheyear.htm, Retrieved Feb. 27, 2004.

Image-X, "http://web.archive.org/web/19991009190352/imagexx.com/news/pressrel/default.htm", Retrieved Feb. 28, 2004, 4 ppgs.

Internet Archive Wayback Machine, Retrieved http://web.archive.org/web/199805200000939/imageexx.com/personal.htm, Feb. 29, 2004, 16 ppgs.

Intertech, "Intertech Information Management, Inc. Announces Application Service Provider Model, Washington Document Service Becomes First Customer to Outsource InterTech Solutions," Sep. 22, 1999, pp. 1-3, Dallas, Texas.

Intertech, "Intellists Uses Intertech Solution To Help Ascensus and CAN Life Cut Costs And Decrease Processing Time With New Imaging System," Nov. 4, 1999, Los Angeles, California.

Canadian Intellectual Property Office, Canadian Examiner Report dated Apr. 12, 2005, pp. 1-4, , Ottawa, Ontario, Canada.

Canadian Office Action for corresponding Application No. 2,400,010 received Mar. 25, 2009.

* cited by examiner

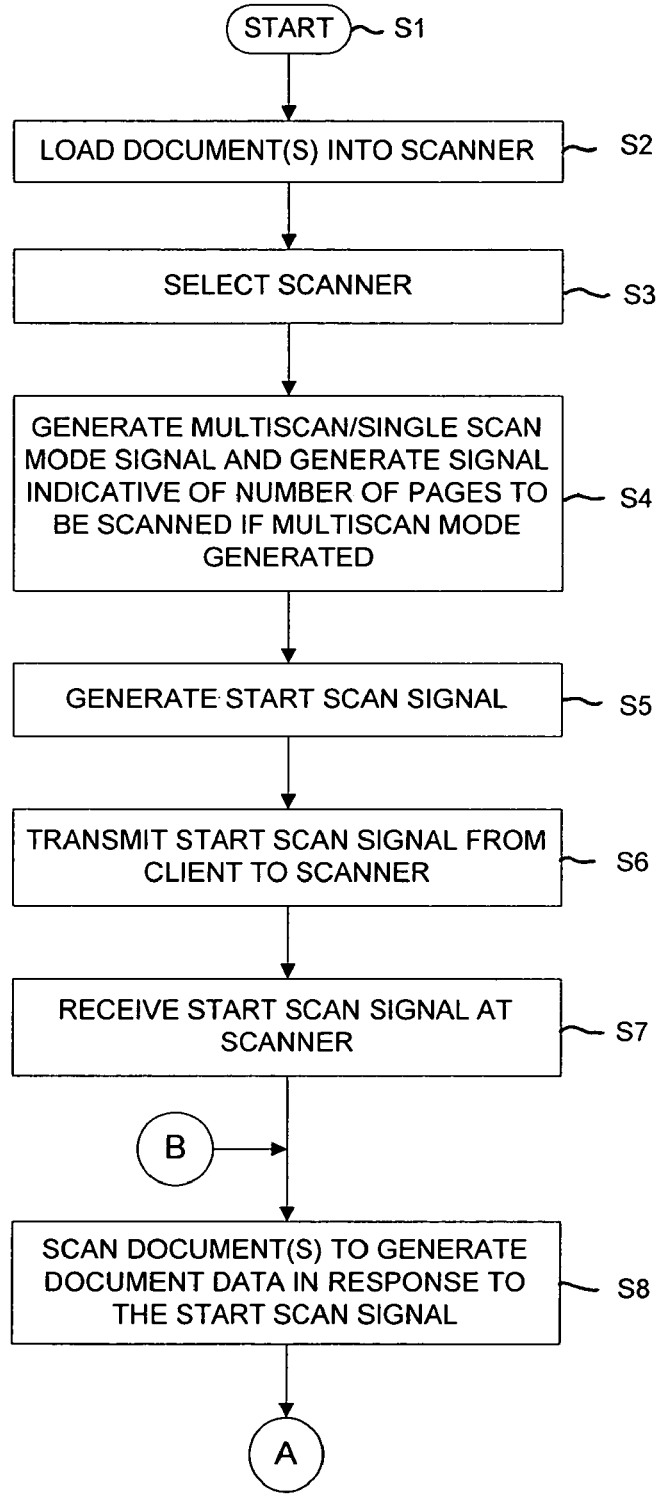

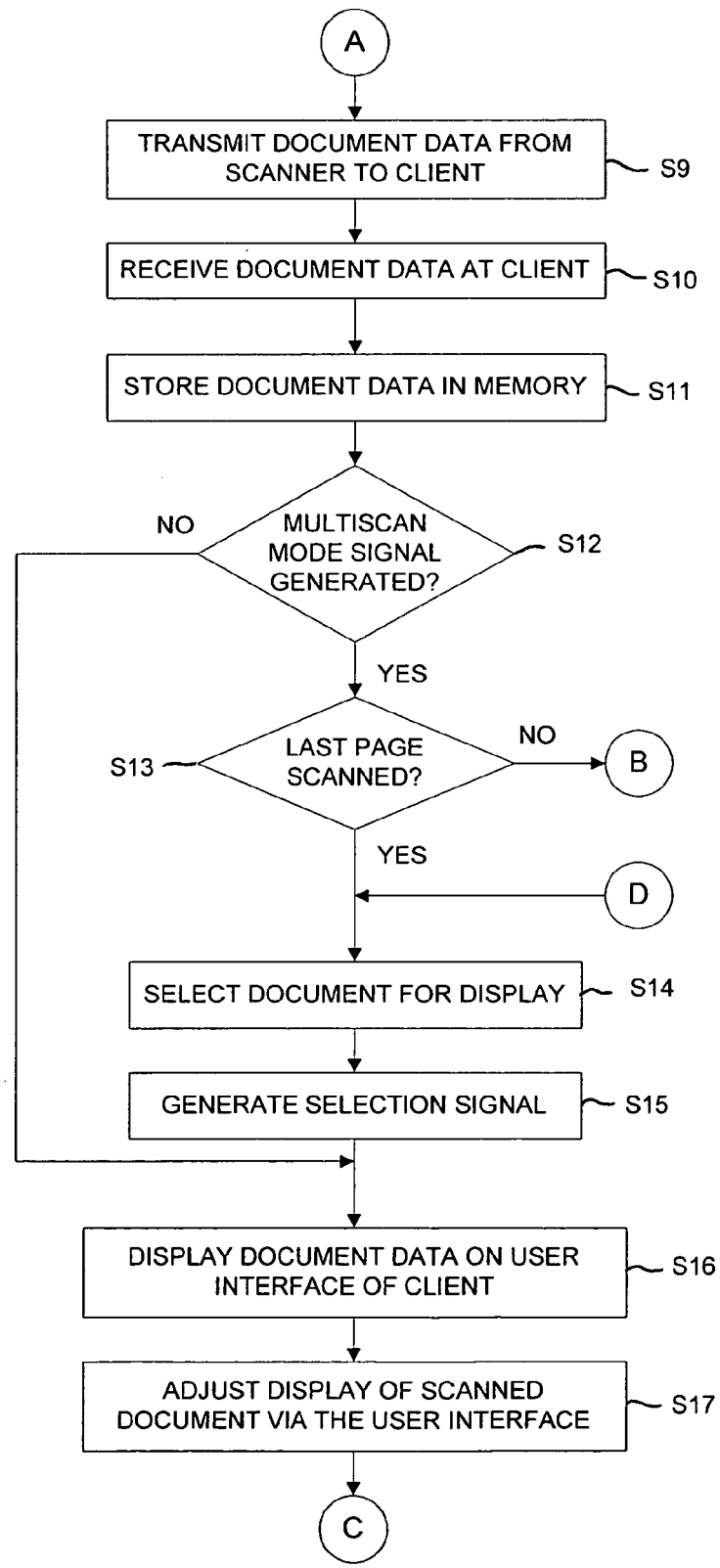

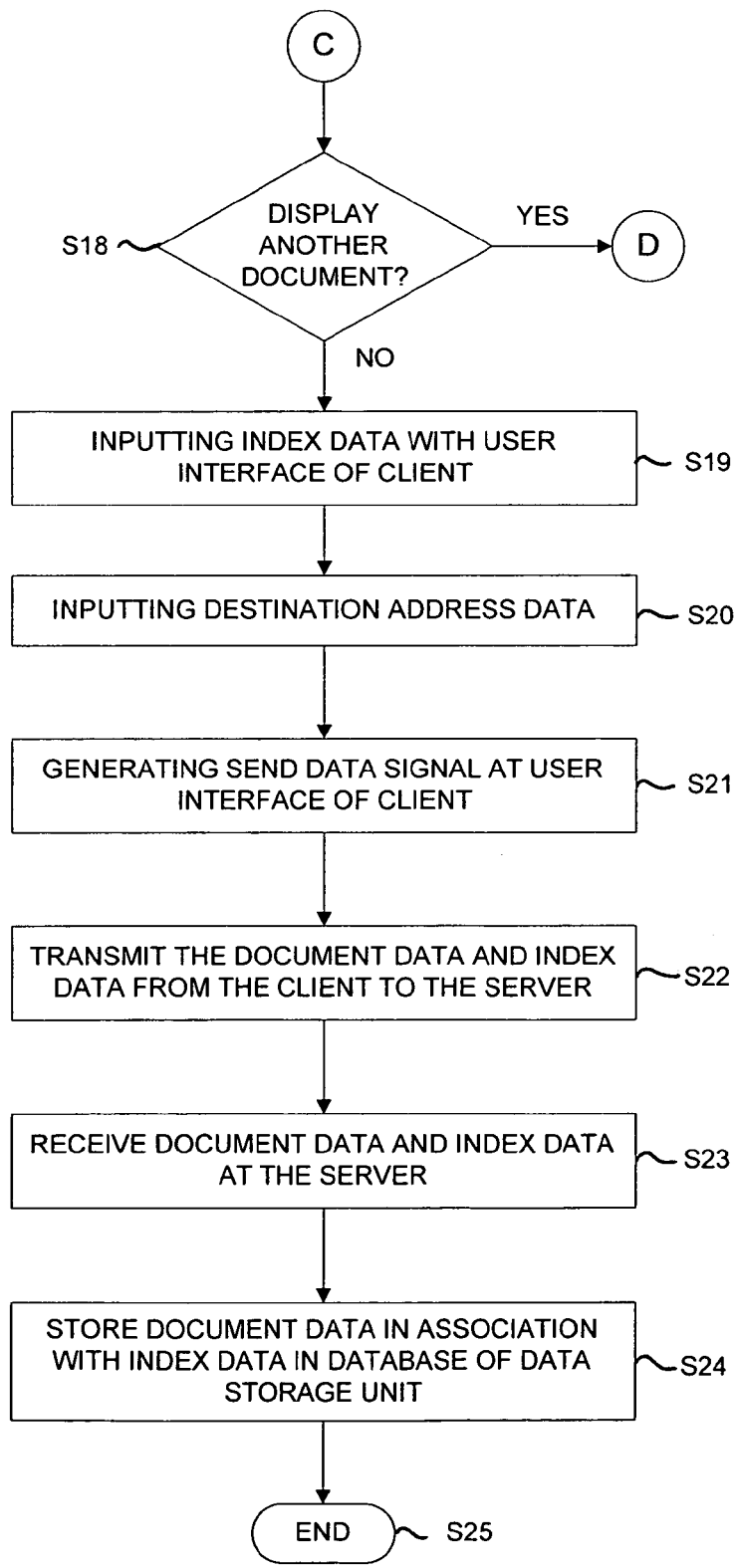

SYSTEM AND METHOD FOR SCANNING A DOCUMENT IN CLIENT/SERVER ENVIRONMENT

FIELD OF THE INVENTION

1. Background of the Invention

The system and method of the invention are generally directed to document scanning to convert a document from printed form to electronic form, and to storage of the document data files in a database to permit access thereof by multiple parties to a transaction or proceeding. The system and method are further directed to transmission of data between client devices and servers coupled by one or more networks. The invention can be used to transfer documents in electronic form between parties to virtually any transaction or proceeding, such as mortgage lending transactions or the management of documents related to court proceedings, for example. The invention can also be used to generate a display of a scanned document that is accessible to the public or to users with security privileges via the Internet.

2. Description of the Related Art

Many commercial transactions require the transfer of numerous documents between parties for their consummation. For example, mortgage lending scenarios involve the transfer of several documents between the mortgage broker, the mortgagee, the mortgagor, and various government entities, to complete a transaction. As another example, a court proceeding often involves the filing and management of numerous documents and their transfer between the parties. Tracking the transfer of documents that have been received by a necessary party(ies) and those that remain outstanding to be transferred to a party(ies) is generally very difficult throughout the course of a transaction or proceeding. In addition, the amount of time required to transfer the documents is greatly increased by delays in transferring the required documents by mail services. Although facsimile technology is now in widespread use and has enhanced speed of consummation of transactions in many industries relative to sending or delivering documents in letters sent between the various parties, facsimile technology is not without disadvantages. For example, it is not uncommon for facsimile documents to be lost either before or after transmission, or to arrive at the destination in unreadable form. In addition, a separate facsimile transmission must be made to each party that is to receive the document, a fact that generally increases the likelihood that a mistake will be made in transmission of the documents. Another media for transfer of documents that has become relatively widespread is electronic mail ("e-mail"). E-mail has file attachment features that can be used to transfer document files between parties via the internet. However, the documents are not visible to the recipient without opening the e-mail and then the attached file. Therefore, if a party to a transaction is looking for a particular document, that person generally must open the document file to determine what it contains unless the person transmitting the document indicated in the text of the e-mail message what the attached document is with sufficient clarity for the recipient to determine its content unambiguously. In addition, the use of e-mail to attach a file to send such file to a party is for many people relatively complicated, and requires a considerable degree of computer skill that many persons do not have. Furthermore, it is relatively difficult to scan a document to generate a document file, open a network connection to an internet service provider, compose an e-mail addressed to the recipient that is to receive the document, attach the document file to an e-mail, and send the e-mail to the recipient via the network. It would be desirable to overcome these disadvantages of previous techniques for handling documents.

U.S. Pat. No. 5,911,044 (the "'044 patent") issued Jun. 8, 1999 to Robin Lo et al. discloses a system and method in which a client device and scanner server are connected by a network. The scanner server is connected to a scanner. The client device can control and receive information from the image scanner over the network because the client application includes a TWAIN driver interface that permits the client device to act as though it were directly connected to the scanner. However, from a practical standpoint, the '044 patent requires the scanner and client device to be located relatively close to one another so that a single user can operate both the scanner and the client device. Otherwise, the user of the client device must communicate with a remote scanner operator to indicate the document desired to be scanned so that such operator can load the scanner with the appropriate document. In addition, the image files of the '044 patent are stored at the client device where they are not generally accessible to other users on the network. Moreover, the communications between the client device and the scanner server in the '044 patent require a non-standard protocol that is difficult to implement at both the client device and the scanner server, and that would not permit the system to function if the client device, the scanner server, or the scanner were replaced with a unit incompatible with such protocol. It would be desirable to overcome these disadvantages of previous technologies.

SUMMARY OF THE INVENTION

The invented system and methods have as their objects to overcome the above-stated problems with previous devices and techniques, and do in fact overcome such problems and provide significant advantages over the prior art.

A first method includes generating a display on a user interface of a client device. The display includes a document display portion, an index field portion, and a control portion. The document display portion includes a display of document data representing the scanned document. The index field portion includes at least one field to permit index data to be input to the user interface in association with the document data. The control portion includes at least one control element for generating a start scan signal to initiate scanning of the document with the scanner for generation of the document data, and a send data signal to transmit the document data with the index data to a server. The control portion can include a control element activated to alternately generate the start scan signal and the send data signal with respective successive activations of the control element. The control portion can also include a control element that can be activated to adjust the scale of the display of the document data. For example, the control element used for adjusting can also be activated to increase the scale of the display of the document data ("zoom in"), and/or to decrease the scale of the document data ("zoom out"). The control element used for adjusting can also be activated to scale the document data to fit within the document display portion of the user interface. The control element used for adjusting can be activated to scale the document data for display in the document display portion to the same scale as the scanned document. The control portion can include a control element for selecting document data from among a plurality of scanned documents. The selected document can be displayed on the document display portion of the display. The index field portion includes at least one field to permit a user to input user-defined alphanumeric characters or text to identify the document displayed in the document display portion, and/or to input a network destination address such as an URL, to which the document data and optionally also the index data, are to be sent.

A second method of this invention includes generating a start scan signal at a user interface of a client device, transmitting the start scan signal from the client device to a scanner, receiving the start scan signal at the scanner, and scanning a document with the scanner to generate document data, in response to the received start scan signal. The user interface can include a web browser that displays a hypertext mark-up language (HTML) document with a control element that can be activated by a user to generate the start scan signal. The control element can be implemented as a software button on a user interface. The second method can further include transmitting the document data from the scanner to the client device, receiving the document data at the client device, and generating a display including the scanned document on the user interface of the client device, based on the received document data. The method can further include adjusting the display of the scanned document via the user interface. The adjusting can be performed so as to increase the scale of the display of the scanned document ("zoom in") and/or to decrease the scale of the display of the scanned document ("zoom out") on the user interface. The adjusting can include scaling the display of the scanned document to fit within the document display portion of the display of the user interface of the client device, and/or to have the same scale as the scanned document. The second method can include generating a multiscan mode signal at a user interface of the client device to generate document data for a plurality of documents. The second method can further include generating a selection signal at the client device including at least one of the first, last, next and previous scanned documents for display, and displaying the document data for one of the scanned documents, based on the selection signal. The second method can also include inputting predetermined index data into the user interface of the client device, generating a send data signal at the user interface of the client device, transmitting the document data and index data from the client device to the server in response to the send data signal, receiving the document data and index data at the server, and storing the document data in association with the index data in a database of a data storage unit. The index data can include a network destination address to which the document data is to be sent. The index data can include predetermined identification data to identify the document. The document data and the index data can be transmitted between the server and client device in hypertext transfer protocol (HTTP) format. The start scan signal and the send data signal can be input by a user via a common control element of the user interface that can toggle between scan and send modes. The second method can also include generating a display of the scanned document on the user interface via the client device, based on the document data.

A system of this invention includes a scanner, a client device, and a server. The scanner is coupled to the client device. The client device can include a processor, and a memory, input device, and display unit, that are coupled to the processor. The client device can be coupled to the server via a network such as the Internet. The processor operates under a predetermined control program stored in its memory to generate a display on the display unit. The display includes document display portion, an index field portion, and a control portion. The document display portion displays document data generated by scanning the document with the scanner. The index field portion permits index data to be input via the input device for association with the document data. The control portion includes at least one control element for generating a start scan signal with the input device to initiate scanning of the document with the scanner. The control element can also be used to generate a send data signal with the input device to transmit the document data with the index data to the server. The control element can be activated with the input device, and can alternate between generating the start scan and the send data signal between successive activations of such control element. The display unit can include a control element activated with the input device to adjust the scale of the display of the document data. The control element(s) can be activated to increase the scale of the display of the document data ("zoom in"), and/or to decrease the scale of the display of the document data ("zoom out"). The control element can be activated to scale the document data to fit within the document display portion of the user interface, and/or to scale the display of the scanned document in the document display portion to the same scale as the scanned document. The control element can be activated with the input device to select document data from among a plurality of scanned documents for display on the document display portion of the display. The system can further include a database storage unit coupled to the server, that can receive document data and/or index data transmitted by the processor, and store the index data in association with the document data. The document data and/or index data can be accessible to remote users via respective client devices coupled to the network.

An object of the invention is to provide a system and method with the capability to scan a document and generate a display of such document within a web browser.

Another object of the invention is to provide a system and method with the capability to scan and transfer documents in electronic form between parties to a transaction or proceeding in a manner that is greatly simplified and rapidly executed as compared to previous technologies.

A further object of the invention is to provide a system and method with the capability to transfer scanned documents in a standard communication protocol such as hypertext transfer protocol (HTTP), as opposed to a protocol that is proprietary or not relatively readily available to the general public using an internetwork such as the world wide web or Internet.

These together with other objects and advantages, which will become subsequently apparent, reside in the details of construction and operation as more fully hereinafter described and claimed, reference being made to the accompanying drawings, forming a part hereof wherein like numerals refer to like parts throughout the several views.

BRIEF DESCRIPTION OF THE DRAWINGS

FIGS. 5A-5C are flowcharts of a second method of the invention.

DESCRIPTION OF THE PREFERRED EMBODIMENTS

As used herein, the following terms have the following definitions:

"Client device" is a device that accesses resources of another device (i.e., server) via a network. The client device is coupled to receive document data from a scanner, and can transmit the document data to a server. The client device can be a personal computer, a network terminal, a personal digital assistant, or other device.

"Coupled" in an electronic sense refers to joining electronic components together with a conductive line such as a wire or cable, or by transmission of signals through air or other media, for example.

"Document" refers to a sheet of material having text or image(s) formed thereon. In connection with hypertext mark-up language (HTML), an HTML document is computer-readable code that can be used to generate a display with a web browser.

"Input device" refers to a keyboard, mouse, wand or any other device that can be operated by a user to input commands or data into a client device.

"Server" refers to a processing device that is responsive to commands from a client device. The server can be a computer. The server can also be capable of handling document data from the client device. "Network server" is a server for handling transmission of document data between one or more client device(s) and an internetwork such as the world wide web or Internet. "Database server" is a server for handling transfer of document data between the network server and a data storage unit.

"Standard protocol" means a protocol in use by more than one million users.

"(s)" at the end of a word means "one or more." For example, "subsystem(s)" means "one or more subsystems."

"Web browser" or "browser" is an application program that has the capability to parse and display an HTML document. For example, the web browser can be Internet Explorer® version 4.0 program available from Microsoft® Corporation, Redmond, Wash., or Communicator® version 6.7 program available from Netscape, Inc. "Web browser" also encompasses within its meaning HTML viewers such as those used for personal digital assistants (PDAs).

Figure 1:
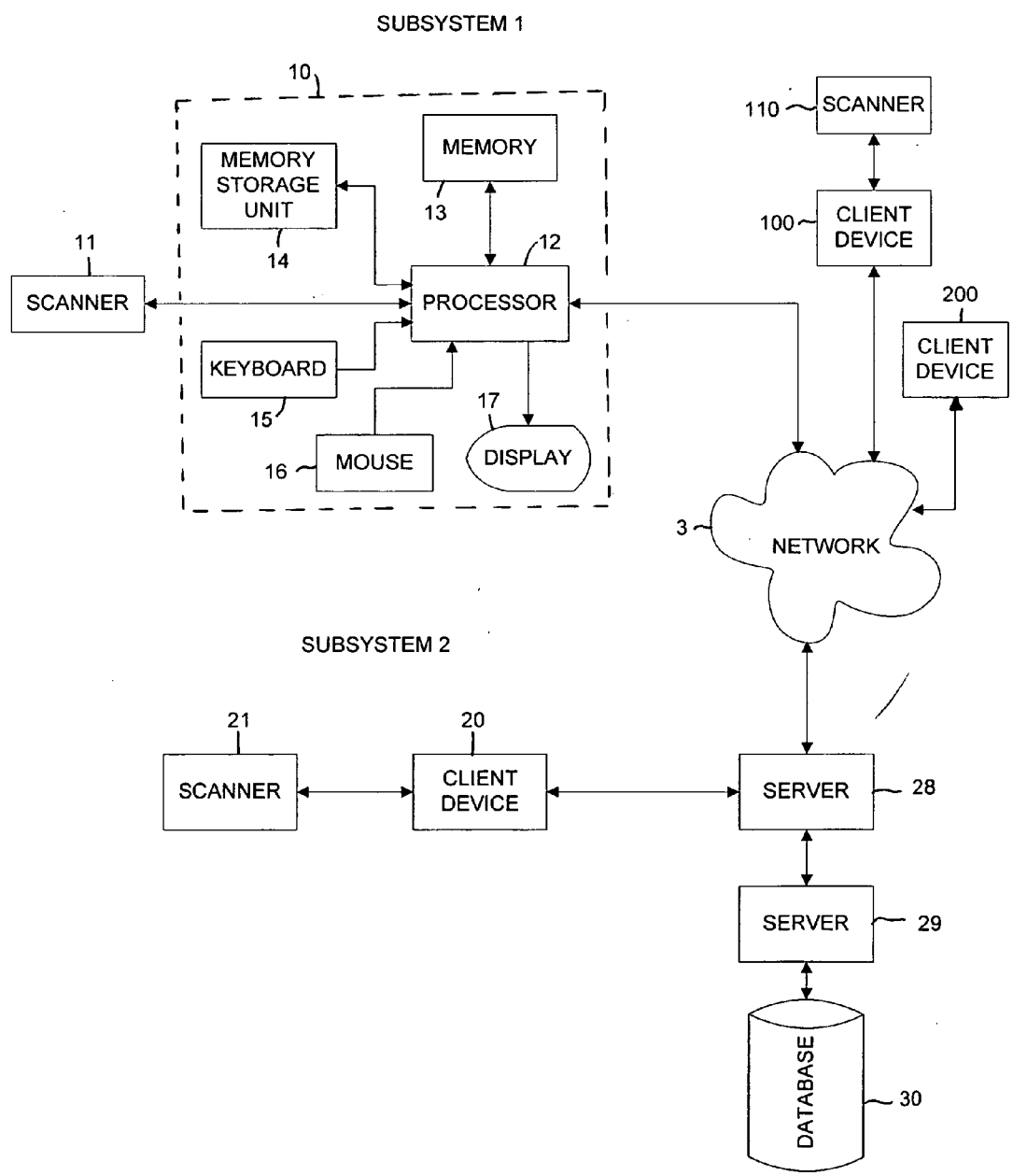
FIG. 1 is a block diagram of a system in accordance with the invention.

In FIG. 1, the system of the invention basically includes a subsystem 1 and a subsystem 2 coupled via a network 3. The network 3 can be local area network (LAN), wide area network (WAN), virtual private network (VPN), or "the Internet", for example. The subsystem 1 includes a client device 10 and a scanner 11. The client device 10 is coupled to the scanner 11 and the network 3. Like all elements coupled to the network 3, the client device 10 can be coupled to such network by a communication interface that can be a standard telephone line, T1 line, broadband, digital subscriber line (DSL) using TCP/IP (HTTP), FTP, or other standard protocols for the signals transmitted thereon. The client device 10 includes a processor 12, a memory 13, a memory storage unit 14, a keyboard input device 15, a mouse input device 16, and a display unit 17. The subsystem 2 can include a client device 20 and a scanner 21. If present in the subsystem 2, the client device 20 is coupled to the scanner 21 and the network 3. The subsystem 2 includes a network server 28, a database server 29, and a database storage unit 30. The network server 28 is coupled to the network 3 and the database server 29. The database server 29 is coupled to the database storage unit 30. In general, one or more additional subsystems like the subsystem 1 can be coupled to the network 3. For example, as shown in FIG. 1, a subsystem including the combination of the client device 100 and the scanner 110 can be coupled to the network 3. Moreover, one or more subsystems such as the client device 200 that has no scanner, can be coupled to the network 3. A subsystem that has a scanner is capable of generating document data and optional index data in accordance with this invention for transmission to and storage in the database maintained by the database storage unit 30. The client device of any subsystem has the capability to access document data and optional index data generated by that or another subsystem if privileged to do so by security measures implemented by the network server 28 and/or database server 29. There are numerous well-known encryption/decryption techniques and privilege schemes for implementing effective security measures to guard against access by unauthorized users to the document data and optional index data, which are suitable for use with this invention. However, such security measures are not a focus of this invention, and any reference herein to access by one user of document data or optional index data generated by another is presumed to be authorized. Importantly, using a client device of a subsystem, a user has the capability to access document data and optional index data generated by another subsystem even though the document(s) from which such data was derived is not physically available to such user. This feature of the invention permits rapid facilitation of transactions or proceedings involving the exchange of documents between users. Moreover, the document data and optional index data can be stored electronically so that physical deterioration of the corresponding documents over time results in no loss of information so long as the integrity of the document data is maintained.

The client device 10 can be one of many devices, including personal computers commercially available from Dell® Corporation, Round Rock, Tex., Compaq® Corporation, Houston, Tex., and others. The processor 12 can be a microprocessor such as a Pentium® I, II or III, Pentium Pro®, Celeron®, or Merced® microprocessor produced by Intel® Corporation, Palo Alto, Calif., an Athlon® or K7-generation microprocessor produced by Advanced Micro Devices®, Inc., Palo Alto, Calif., or an equivalent or more advanced generation of microprocessor. Alternatively, the processor 12 can be implemented as a microcontroller, programmable logic array (PLA), field programmable logic array (FPLA), programmed array logic (PAL), or other processing device. The processor 12 is coupled to a memory 13 that can include a random-access memory (RAM) and a read-only memory (ROM). The RAM provides relatively high-speed data and program access to the processor 12. The ROM stores data in a non-volatile fashion such as the basic input/output system (BIOS) executed by the processor 12 upon power-up of the client device 10. The memory 13 stores the control program and operating system used by the processor 12 in operation thereof. The memory 13 also stores predetermined data therein or that is generated by the processor 12 as it executes the control program. The memory 13 can also store display data in the form of pixel data with position, intensity, hue and luminescence information, for example. The memory 13 is of course of sufficient size to hold such data, and can be on the order of one megabyte or more, for example. The display data can be used to generate a display signal from which the processor generates a visual display for a user on the display unit 17. The processor 12 is also coupled to a memory device 14 such as a hard disk-drive unit. The memory device 14 stores application programs and data files if not in use by the processor 12. The keyboard input device 15 and mouse input device 16 can be operated by a user to generate and supply data or command signals to the processor 12. The processor 12 is coupled to supply a display signal to the display unit 17. The display signal is generated by the processor 12 and stored in the memory 13. The processor 12 can periodically retrieve the display data from the memory 13 and generate the display signal based thereon.

The scanner 11 can be one of numerous commercially-available models including several units produced by Hewlett-Packard® Corporation, Palo Alto, Calif., Mustek® Corporation, Muster, Germany, Microtek Lab®, Inc., Redondo Beach, Calif., and others. The scanner 11 is configured to scan a document in printed form to generate electronic document data therefrom. The processor 12 receives the document data and stores it as display data in the memory 13. The processor 12 generates the display on the display unit 17 based on the document data.

The client devices 20, 100, 200 and the scanners 21, 110 are similar or identical in function and configuration to the client device 10 and scanner 11, respectively. Accordingly, a detailed description of these elements is omitted as redundant to the description provided with respect to client device 10 and the scanner 11.

The network server 28 can be coupled to the client device 20 and the scanner 21 if used in the subsystem 2, although such units are not essential elements of the subsystem 2. The network server 28 is coupled between the network 3 and the database server 29. The network server 28 can be one of many commercially-available units produced by Dell® Corporation and others. The capabilities of the network server 28 depend upon the processing demands required by the subsystems coupled to the network 3. Although not shown in FIG. 1, one or more additional computers such as the client device 20 could be included in the subsystem 2 and coupled to the server 28 such as by Ethernet® connections and interface cards. The server 28 is coupled to the network 3 via standard connection interfaced. For example, if the network 3 is an internetwork (such as the world wide web or "the Internet"), the communication interface could be a standard telephone line, T1 line, broadband, digital subscriber line (DSL) or other connection using TCP/IP (HTTP), FTP, or other standard protocols for the signals transmitted thereon. The network server 28 receives commands, document data and optional index data from the scanner(s) and client device(s) of the subsystem(s) coupled to the network 3.

The network server 28 is coupled to the database server 29 that is in turn coupled to the database storage unit 30. The network server 28 is also coupled to the client device 20. The database server 29 receives, stores, and manages document data generated by one or more of the scanners 11, 21 and optionally also associated index data generated by the user with one or more of the input devices of the client devices, in the database storage unit 30. The database server 29 manages the database stored in the database storage unit 30 by inputting, deleting, rearranging stored data, and/or handling queries for data based on commands and data generated by users of the system via the scanners and client devices. The database storage unit 30 can be a hard-disk storage unit and can be used to store document data and index data generated by users via the client devices and scanners. Numerous models of units that can be used for the servers 28, 29 and the database storage unit 30 are commercially-available from many manufacturers, including many mentioned herein.

Figure 2:
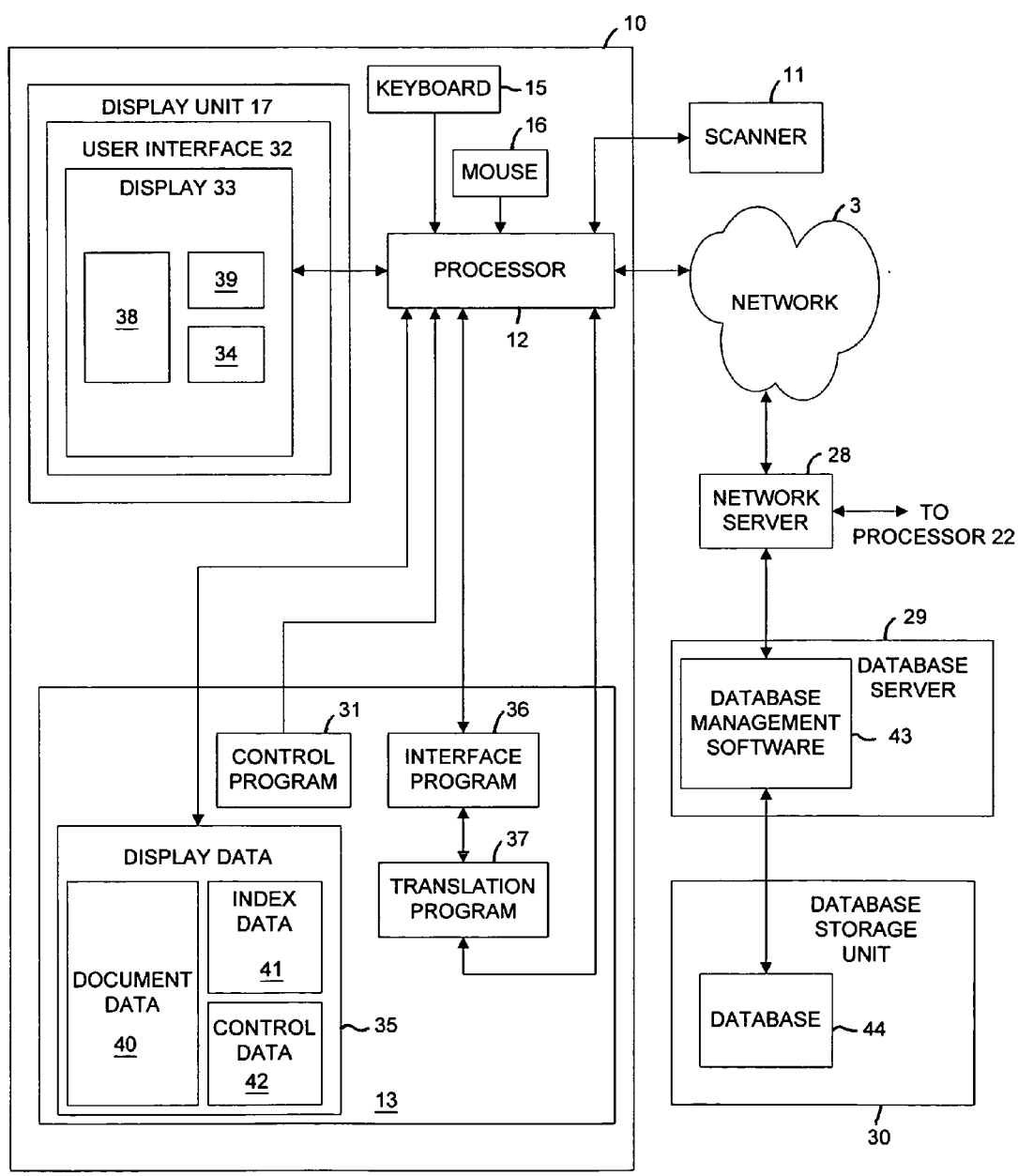
FIG. 2 is a relatively detailed block diagram of the system of the invention.

In FIG. 2, a more detailed diagram of the subsystem 1 and a portion of the subsystem 2 are shown. The device 10 functions as a client of the server 28 in the system of FIG. 2. The client device 10 displays or "exposes" a user interface 32 to the user of the system 1. In this case, the user interface 32 is a web browser. The user interface 32 generates a display 33 that in this case is a web page display generated by a hypertext mark-up language (HTML) document. A user of the client device 10 can use the input device(s) 15, 16 and user interface 32 to generate and supply data and/or command signals to the processor 12. More specifically, the user can operate the input device 16 to move a cursor (not shown in FIG. 2, but shown in FIG. 3) on the display 33 to a control portion 34 thereof. The user can operate the input device 16 using a control element in the control portion 34 of the display 33 to generate a start scan signal. The control portion 34 of the display 33 can include a control element such as a software button upon which the user can click with the mouse input device 16 to generate the start scan signal. In response to the start scan signal entered by the user at the user interface 32, the script included within the HTML document stored as display data 35 in the memory 13 runs on the processor 12. Execution of the script in turn causes the processor 12 to execute an interface program 36 and a translation program 37. The start scan signal is in effect converted through such program and the translation program 37 into a format compatible with the scanner 11. The interface program 36 can be implemented as an ActiveX Control or JAVA program, for example. The interface program 36 can include a dynamically-linked library (".dll" extension) that couples pixel data from the scanner 21 to the user interface or web browser 32. The translation program 37 can be a program that is commercially-available from numerous sources including Pixel Translations, Inc., North America, a division of Input Software, Inc. (see www.pixtran.com). The converted start scan signal passes from the translation program 37 back through the processor 12 to the scanner 11. The interface program 36 and the translation program 37 in effect convert the start scan signal into a format compatible with the scanner 11. In response to the start scan signal, the scanner 11 scans a document loaded therein to generate document data 40. The scanner 11 is coupled to supply the document data 40 to the processor 12 that feeds such data through the translation program 37 and the interface program 36 back to the processor 12. The processor 12 stores the document data 40 converted through the translation program 37 and the interface program 36, in the memory 13 as display data 35. If the user inputs a multiscan signal via the input device 16 and the user interface 32, the processor 12 activates the start scan signal supplied to the scanner 11 to scan the next document of a set or batch of documents to be scanned. The document data 40 for the next document is received by the processor 12, converted in format via the translation program 37 and the interface program 36, and is again received and stored by the processor 12 as display data 35 in the memory 13. The user can move the cursor on the user interface 32 with the input device 16 to a control element of the control portion 34 such as a software button, and can activate such input device to generate a selection signal. The selection signal indicates a particular document among a plurality of documents to be displayed on the unit 16. The input device 16 supplies the selection signal to the processor 12. Based on the selection signal, the processor 12 reads document data 40 for the selected document from the memory 13, and supplies such document data as a display signal to the display unit 17. The display signal is used to generate a display of the scanned document in the document display portion 38 of the display 33. The user can further manipulate the input device 16 to move the cursor 45 to the control portion 34 of the display 33 to activate one or more control elements to adjust the display of the scanned document in the document display portion 38 on the user interface 32. Such activation of the input device 16 as the cursor is positioned over the adjustment control element on the display 33 results in the generation of an adjustment signal supplied from the input device 16 to the processor 12. Based on the adjustment signal, the processor 12 reads the document data from the memory 13 and performs adjustment action thereon. Such adjustment action can include increasing the scale of the document data ("zooming in"), decreasing the scale of the document data ("zooming out"), scaling the document data to fit entirely within a predetermined area defined by the document display portion of the display 33, and/or scaling the document data to the same scale as the scanned document. The processor 12 supplies the adjusted document data 40 to the user interface 32 to generate a display of the document in the document display portion 38. The processor 12 can also store the adjusted document data 40 in the memory 13.

Figure 3:
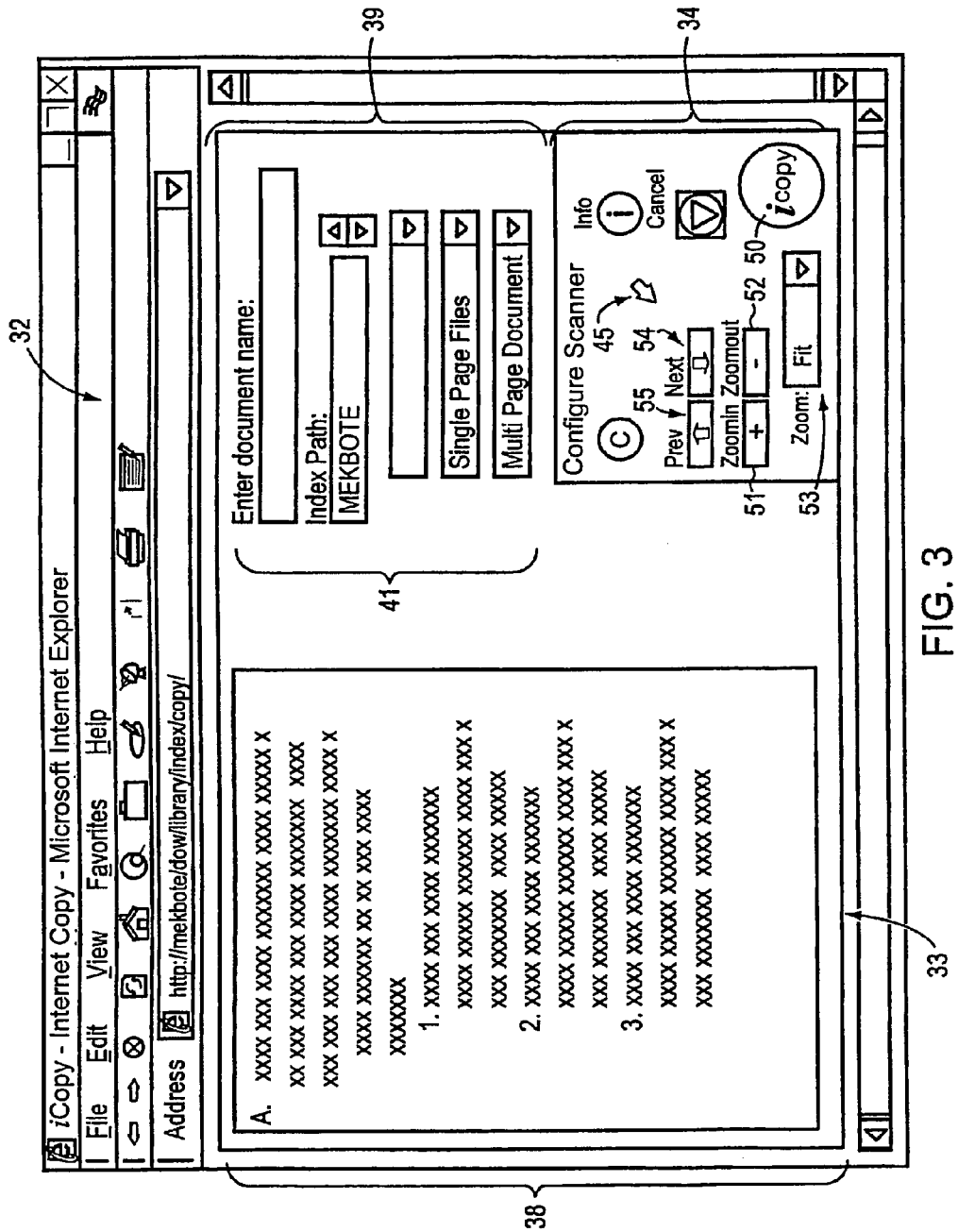
FIG. 3 is a view of a user interface generated on a web browser of a client device.

FIG. 3 is a view of an exemplary display 33 for the user interface 32 generated on the display unit 17. The display 33 on the user interface 32, in this case a web browser, includes the document display portion 38, the index data portion 39, and the control portion 34. The control portion 34 includes control elements 50-55 that are implemented in this case as software buttons. The control elements can be activated via the input device 16. The input device 16 can be used to move the cursor 45 to a user-selected control element. The user can activate the mouse input device 16 by moving the cursor 45 over a selected control element to generate a control signal. More specifically, the user can move the mouse input device 16 to position the cursor 45 over the control element 50 labeled "iCopy" in FIG. 3 and clicking thereon with such input device. The activation of the mouse input device 16 and the position of the cursor 45 on the display 33 upon activation of such device result in the generation of a start scan signal by the mouse input device. The start scan signal is supplied from the mouse input device 16 to the processor 12 that supplies such signal to the scanner 11 via the interface program 36 and the translation program 37. The converted start scan signal is supplied to the scanner 11 via the processor 12 to initiate scanning of a document loaded therein. The start scan signal is preferably generated on the release of the mouse input device 16 with the cursor 45 overlying the control element 50 on the display 33. The release of the control element 50 causes the processor 12 to toggle the state of such control element to display "iSend" in place of "iCopy". On the next activation of the mouse input device 16 with the cursor 45 positioned over the control element 50, the mouse input device 16 and the processor 12 generate a send data signal, and the processor 12 changes the display of the control element 50 from the "iSend" or send mode button stored image data in the memory, back to the "iCopy" or copy mode button also stored as image data in the memory 13. Based on the generation of the send data signal, the processor 12 reads document data and any index data input by the client from the memory 13, and transmits such data via the network 3 to a server at a network destination address specified by data input by the user of the subsystem 1. The control element 50 can thus be implemented to serve a dual function in that it can be used both to generate the start scan signal and to generate the send data signal. Alternatively, two different control elements could be used to generate the start scan signal and the send data signal. The control portion 34 also includes control elements 51-53 that can be used along with the input device 16 and the processor 12 to generate adjustment control signals for the display 33. More specifically, the control portion 34 includes a "zoom in" control element 51 used to generate the control signal to increase the scale of the document data 40 displayed on the document display portion 38. The control portion 34 also includes a "zoom out" control element 52 to decrease the scale of the document data 40 to generate a display of the scanned document in the document display portion 38 via the input device 16 and the processor 12. The control element 53 of the control portion 34 includes a pop-down menu with a "Fit" option that can be selected to generate an adjustment control signal via the mouse input device 16 and the processor 12, to adjust the display 33 of the scanned document generated with the document data 40 so as to fit within the document display portion 38 of the display 33. The control element 53 of the control portion 34 includes a pop-down menu with a "100%" option that can be selected along with the input device 16 and the processor 12, to generate an adjustment control signal that scales the display 46 of the document data in display portion 38 to the same size as the scanned document. The control portion 34 includes a control element 54 that can be used to generate a signal via the input device 16 and the processor 12. The signal generated by activation of the control element 54 causes the processor to generate a display signal using the document data for the next one of a plurality or series of scanned documents relative to the document displayed in the document display portion 38 immediately before activation of the control element 54. The processor 12 supplies the display signal to the display unit 17 to generate a display of the next document in the document display portion 38. The control portion 34 also includes a control element 55 that can be used to generate a signal via the input device 16 and the processor 12. The signal generated by activation of the control element 55 causes the processor to generate a display signal using the document data for the previous one of a plurality or series of scanned documents relative to the document displayed in the document display portion 38 immediately before activation of the control element 55. The processor 12 supplies the display signal to the display unit 17 to generate a display of the previous document in a plurality or series of scanned documents. The index field portion 39 of the display 33 permits a user to input various index data 41 in the memory 13 via one or more of the input devices 15, 16 and the processor 12. In the particular example of FIG. 3, the index field portion 34 includes fields for entering information related to the scanned document displayed in the document display portion 38. The index data 41 can include information that identifies the document data 40 associated with such index data. The index data 41 can, for example, include a document name or identification number, an index path indicating a subdirectory in which the scanned document is to be stored at the server 28 upon uploading the scanned document, or text explaining the nature of the scanned document or a matter or transaction to which the document relates. The index data 41 also includes data selected from fields to indicate whether scanned documents are to be stored in the server 28 as individual single page data files, or whether a plurality of scanned documents are to be stored as a single multipage document data file. Upon activating the control element 50 in its send mode, the document data 40 and optionally also the index data 41 if used, are sent from the memory 13 to the server 28 via the processor 12 and the network 3. From the server 28, the document data 40 and optional index data 41 are supplied to the database server 29. The database server 29 operates under control of database management software 43 such as a software package commercially-available under the trademark DocuPACT® produced by Intertech Information Management Systems, Inc., Dunwoody, Ga., the assignee of the subject application. Under control of the database management software 43, the database server 29 stores the document data and optional index data together in the database 44 of the database storage unit 30.

The browser 32 includes an address field for entering a network address such as a universal resource locator (URL) for uploading the document data 40 and optional index data 41 from the processor 12 to the server(s) 28, 29. In this case, such URL is designated by inputting the URL into the address field of the browser 32 via the processor 12 and one or more of the input devices 15, 16.

Figure 4:
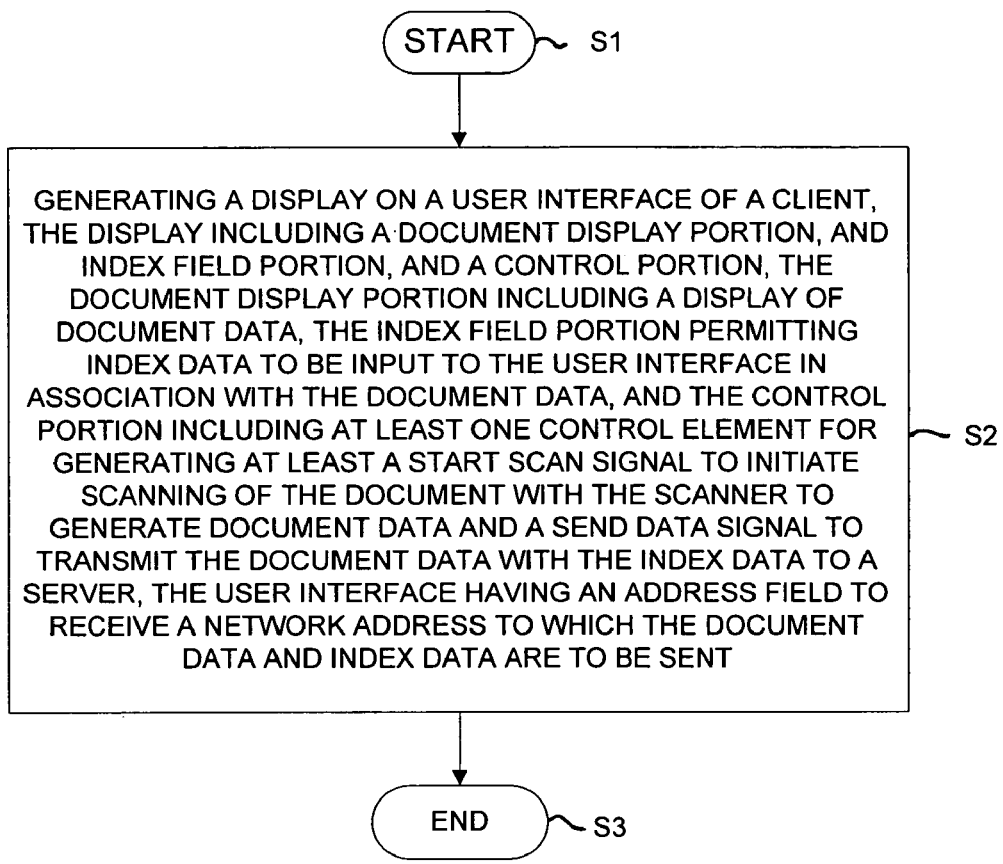
FIG. 4 is a flowchart of a first method of the invention.

In FIG. 4, a first method of the invention begins in step S1. Step S2 includes generating a display on a user interface of a client device, the display including a document display portion, an index field portion, and a control portion. The document display portion includes a display of document data, the index field portion permits index data to be input to the user interface for association with the document data, and the control portion includes at least one control element for use in generating at least a start scan signal to initiate scanning of the document with the scanner to generate the document data, and a send data signal to transmit the document data with the index data to a server. The control element can be used by a user along with one or more input devices 15, 16 and the processor 12 to alternately generate the start scan signal and the send data signal with successive activations of the control element. The control element can be used with one or more input devices 15, 16 and the processor 12 to adjust the scale of the display of the document data 40. The control element can also be used with one or more of the input devices 15, 16 and the processor 12 to increase the scale of the display of the document data ("zoom in"), and/or to decrease the scale of the document data ("zoom out"). The control element can also be used with one or more of the input devices 15, 16 and the processor 12 to scale the document data to fit within the document display portion of the user interface, and/or to scale the document data for display in the document display portion at the same scale as the scanned document. The control portion of the display can include a control element for use with one or more input devices 15, 16 and the processor 12 to select document data from among a plurality of scanned documents for display on the document display portion 38 of the display 33. The index field portion 39 includes fields to permit a user to input user-defined alphanumeric characters or text via the input device 15 to the processor 12 to identify the document displayed in the document display portion. The user interface 32 has an address field to input a network destination address such as an URL, to which the document data and index data are to be sent. In step S3 the method of FIG. 4 ends.

FIGS. 5A-5C are flowcharts disclosing the second method of the present invention. The method of FIGS. 5A-5C discloses the operation of the system 1. In step S1 of FIG. 5A, the method begins. In step S2, one or more documents are loaded into the scanner 11. This step can be performed by one or more users of the system 1. In step S3, the user selects a scanner to be used to scan the document(s). In general, the system 1 can include more than one scanner 11 to permit multiple users to load documents in such scanners, for example. The user operates the input device 15 to generate the scanner selection signal using corresponding control elements (not shown) of the user interface 32. The input device 15 supplies the scanner selection signal to the processor 12. Based on the scanner selection signal, the processor 12 electronically couples itself to the scanner indicated by such signal. In step S4, the user inputs a command via the input device 15 to generate a single scan mode or multiscan mode signal, depending upon whether one document is to be scanned, or more than one document is to be scanned. If the user selects the multiscan mode, the user also uses the input device 15 with the user interface 32 to generate a signal indicative of the number of documents to be scanned. Such signal is supplied from the input device 15 to the processor 12 that stores such signal as data in the memory 13. In step S5, the start scan signal is generated. The start scan signal can be generated by the user with the input device 15 using the user interface 32, and is supplied to the processor 12. In step S6, the processor 12 transmits the start scan signal from the client device 10 to the scanner 11. The processor 12 can transmit the start scan signal from the client device 10 to the scanner 11 via the interface program 36 and the translation program 37, to convert the start scan signal into a form compatible with the scanner 11. In step S7, the scanner 11 receives the start scan signal. In step S8, the scanner 11 scans the loaded document to generate document data 40 in response to the start scan signal. In step S9 of FIG. 5B, the scanner 11 transmits the document data 40 from the scanner 11 to the client device 10. The processor 12 can transmit the start scan signal from the client device 10 to the scanner 11 via the interface program 36 and the translation program 37, to convert the document data from the format output at the scanner to a format usable by the processor 12 to generate the display signal. In step S10, the client device 10 receives the document data 40 at such device. In step S11, the processor 12 of the client device 10 stores the document data 40 in the memory 13. In step S12, the processor 12 performs a determination to establish whether the multiscan signal has been generated by the user by checking data indicative thereof in the memory 13. If so, in step S13, the processor 12 retrieves from the memory 13 and increments count data indicative of the number of documents that have been scanned, and stores the incremented count data in the memory 13. The processor 12 retrieves the predetermined user-defined data indicating the number of pages of documents to be scanned in the batch for which scanning is underway, and compares the respective data to determine whether the last page of the batch has been scanned. If not, the processor 12 repeats step S8 and subsequent steps for the next document. On the other hand, if the determination in step S13 is affirmative, in step S14, the user selects one of the scanned documents for display, and in step S15 uses the input device 15 and the corresponding control element of the user interface 32 to generate a selection signal supplied to the processor 12. After the performance of step S15 or if the result of the determination in step S12 is negative, in step S16, the processor 12 generates a display of the scanned document in the document display portion 38 of the display 33 using the document data 40. In step S17, the user adjusts the display of the scanned document. The adjustment can be performed by the user with the input device 15 and the control elements of the control portion 34 of the user interface 32. In step S18 of FIG. 5C, the user determines whether another document is to be displayed. If so, step S14 and subsequent steps are repeated. On the other hand, if the determination in step S18 is negative, in step S19, the user inputs index data 41 into the memory 13 with one or more of the input devices 15, 16 and the user interface 32 via the processor 12. Such index data can include alphanumeric character data to identify the scanned documents, text to describe the document, and/or other data. In step S20, the user inputs destination address data using one or more of the input devices 15, 16, the user interface 32 and/or the processor 12. The destination address can be a universal resource locator (URL) for the server(s) 28, 29. In step S21, the user operates one or more of the input devices 15, 16 using the control element of the user interface 32 to generate a send data signal supplied to the processor 12 of the client device 10. In step S22, the processor 12 reads document data 40 and index data 41 with the URL of the destination server(s) 28, 29, and transmits the document data and optional index data from the client device 10 to the server 28 via the URL or other network destination address over the network 3. The server 28 supplies the document data and the index data to the server 29. In step S24, the server 29 stores the document data in association with the index data in the database storage unit 30 in the performance of step S24. In step S25, the methods of FIGS. 5A-5C end.

In the foregoing description it should be understood that the configuration and operation of the client device 10 and scanner 11 also describes the configuration and operation of any other client device or scanner coupled to the network 3. In addition, it should be appreciated that the subsystem 2 can be used to generated document data and index data for storage in the database storage unit 30 via the servers 28, 29 in a manner similar to that described with respect to the subsystem 1. Moreover, the document data and optional index data generated by the subsystems 1, 2 can be accessed by one another or other different client devices (not shown) coupled to the server 28 either directly or via the network 3 assuming the database management software has been programmed to permit such data access. Hence, document data and index data stored in the database 30 can be accessed by multiple users of the system via their client devices 30 to obtain information needed to carry out a transaction or proceeding in a relatively facilitated manner. Moreover, it should be appreciated that other modifications of the system and method are possible without departing from the scope of the invention. For example, the web server 28 and the database server 29 can be implemented as one server coupled to the network 3, the client device 20, and the database storage unit 30. In this case the one server is programmed to perform the functions of both servers 28, 29.

The many features and advantages of the present invention are apparent from the detailed specification and thus, it is intended by the appended claims to cover all such features and advantages of the described system and methods which follow in the true spirit and scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the spirit and scope of the invention.

The invention claimed is:

1. A method comprising the step of
a) generating a display based on a hypertext mark-up language (HTML) document stored in a client device using a web browser of a user interface of the client device, the display including a document display portion, an index field portion, and a control portion all visibly defined in the display in separate portions thereof by the HTML document, the document display portion including a display of document data received from a scanner coupled to the client device, the scanner generating the document data by scanning a document in print form, the document data representing the scanned document, the index field portion permitting index data to be input by a user with an input device of the client device into the user interface in association with the document data, and the control portion including at least one control element operable by the user with the input device for generating a start scan signal to initiate scanning of the document with the scanner to generate the document data and for generating a send data signal to transmit the document data with the index data displayed by the web browser from the client device to the server over a network using a destination address for the server specified in an address field of the web browser.

2. A method as claimed in claim 1, wherein the control element is operable by the user with the input device to alternately generate the start scan signal and the send data signal with respective successive activations of the control element with the input device.

3. A method as claimed in claim 1 further comprising:
b) inputting index data identifying the document data into the index field portion.

4. A method as claimed in claim 3 wherein the index data input in said step (b) comprises a document name identifying the scanned document.

5. A method as claimed in claim 3 wherein the index data input in said step (b) comprises an identification number identifying the scanned document.

6. A method as claimed in claim 3 wherein the index data input in said step (b) comprises a file path indicating the subdirectory on the server at which the document data is to be stored.

7. A method as claimed in claim 3 wherein the index data input in said step (b) comprises text explaining the nature of the scanned document.

8. A method as claimed in claim 3 wherein the index data input in said step (b) identifies a matter to which the scanned document relates.

9. A method as claimed in claim 3 wherein the index data input in said step (b) identifies a transaction to which the scanned document relates.

10. A method as claimed in claim 3 further comprising the step of:
c) activating the control element by the user with the user interface to scan the document with a scanner to generate the document data.

11. A method as claimed in claim 10 further comprising the step of:
d) activating the control element by the user to upload the document data representing the scanned document to a server over a network.

12. A method as claimed in claim 1, wherein the control portion includes at least one control element that can be activated by the user with the input device to adjust the scale of the display of the document data.

13. A method as claimed in claim 12, wherein the control element can be activated by the user with the input device to increase the scale of the display of the document data ("zoom in").

14. A method as claimed in claim 12, wherein the control element can be activated by the user with the input device to decrease the scale of the display of the document data ("zoom out").

15. A method as claimed in claim 12, wherein the control element can be activated by the user with the input device to scale the document data to fit within the document display portion of the display.

16. A method as claimed in claim 12, wherein the control element can be activated by the user with the input device to scale the document data for display in the document display portion to the same scale as the scanned document.

17. A method as claimed in claim 12, wherein the control portion includes a control element activated by the user with the input device to select document data from among a plurality of scanned documents for display on the document display portion of the display.

18. A method comprising the steps of:
a) generating at a client device a start scan signal using a control element defined by a hypertext mark-up language (HTML) document stored in the client device and displayed by a web browser of a user interface of the client device in response to a user's operation of an input device of the client device;

b) at the client device, converting the start scan signal into a form compatible with a scanner;

c) at the client device, transmitting the converted start scan signal from the client device to the scanner;

d) receiving the converted start scan signal at the scanner; and e) scanning a document with the scanner to generate document data, in response to the converted start scan signal received in said step (d).

19. A method as claimed in claim 18, wherein said step (a) is performed by depressing and releasing a control element of the user interface of the client device using a mouse constituting at least part of the input device.

20. A method as claimed in claim 18, further comprising the steps of:

f) transmitting the document data from the scanner to the client device;

g) receiving the document data at the client device;

h) at the client device, converting the document data into a form that can be displayed within the web browser of the client device; and i) generating a display including the scanned document on the web browser of the client device, based on the document data converted in step (h).

21. A method as claimed in claim 20, further comprising the step of:

j) adjusting the display of the document data via a user's operation of a control element defined by the HTML document displayed by the web browser within the user interface.

22. A method as claimed in claim 21, wherein the adjusting of said step (j) includes increasing the scale of the display of the scanned document ("zooming in") on the user interface.

23. A method as claimed in claim 21, wherein the adjusting of said step (j) includes decreasing the scale of the display of the scanned document ("zooming out") on the user interface.

24. A method as claimed in claim 21, wherein the adjusting of said step (j) includes scaling the display of the scanned document to fit within the document display portion of the display of the user interface of the client device.

25. A method as claimed in claim 21, wherein the adjusting of said step (j) includes generating the display of the scanned document on the user interface of the client device with the same scale as the scanned document.

26. A method as claimed in claim 21, further comprising the step of:

k) generating a multiscan mode signal via a user's operation of a control element defined within the web browser at the user interface of the client device, said steps (e)-(g) repeatedly performed to generate document data for a plurality of documents, based on the multimode scan signal.

27. A method as claimed in claim 26, further comprising the steps of:

l) generating a selection signal via a user's operation of a control element defined within the web browser of the client device indicating at least one of the first, last, next and previous scanned documents for display; and m) displaying the document data for one of the scanned documents within the web browser of the client device, based on the selection signal generated in said step (l).

28. A method as claimed in claim 21, further comprising the steps of:

k) user inputting predetermined index data into an index field defined by the HTML document separately from a document display portion in which the document data from the scanner is displayed by the web browser of the user interface of the client device;

l) generating a send data signal using the control element operated by a user with the input device and defined by the HTML document displayed by the web browser of the user interface of the client device;

m) transmitting the document data and index data from the client device to the server over an internetwork in response to the send data signal generated in said step (l);

n) receiving the document data and index data at the server; and a) storing the document data in association with the index data in a database of a data storage unit separate from the server.

29. A method as claimed in claim 28, wherein the index data includes predetermined identification data to identify the document.

30. A method as claimed in claim 28, wherein the document data and the index data are transmitted between the server and client device in hypertext transfer protocol (HTTP).

31. A method as claimed in claim 28, wherein the start scan signal and the send data signal are input by the user with the input device via a common control element displayed within the web browser of the user interface that toggles between a first scan mode for the performance of said step (a) and a second send mode for the performance of said step (m).

32. A method as claimed in claim 28, wherein the start scan signal is input by a user with the input device via a first control element displayed within the web browser of the user interface for a first scan mode in the performance of said step (a) and the send data signal is input by a user with the input device via a second control element displayed within the web browser of the user interface in the performance of said step (m).

33. A method as claimed in claim 18, further comprising the step of:

f) transmitting the document data from the client device to a server.

34. A method as claimed in claim 18, further comprising the step of:

f) transmitting the document data from the scanner to a server.

35. A method comprising the steps of a) generating a start scan signal using a control element defined by a hypertext mark-up language (HTML) document stored in the client device and displayed by a web browser of a user interface of a client device, the control element operated by a user with an input device of the client device;

b) at the client device, converting the start scan signal into a form compatible with the scanner;

c) transmitting the converted start scan signal from the client device to a scanner;

d) receiving the converted start scan signal at the scanner;

e) scanning a document in print form with the scanner to generate document data, in response to the converted start scan signal received in said step (d);

f) transmitting the document data from the scanner to the client device;

g) receiving the document data at the client device;

h) at the client device, converting the document data into a form that can be displayed by the web browser of the client device;

i) generating a display including the scanned document in the HTML document displayed within the web browser of the user interface of the client device, based on the document data converted in said step (h);

j) inputting predetermined index data into a field defined separately from a document display portion for the document data in the HTML document displayed by the web browser of the user interface of the client device, the index data associated with the document data displayed by the web browser;

k) generating a send data signal using a control element defined in the HTML document displayed by the web browser of the user interface of the client device;

l) transmitting the document data and index data from the client device to the server over an internetwork in response to the send data signal generated in said step (k) using a destination address of the server specified in an address field of the web browser;

m) receiving the document data and index data at the server via the internetwork; and n) storing the document data received in step (m) in association with the index data in a database of a data storage unit separate from the server.

36. A method as claimed in claim 35 wherein the index data input in said step (j) identifies the scanned document.

37. A method as claimed in claim 36 wherein the index data input in said step (j) comprises a document name identifying the scanned document.

38. A method as claimed in claim 36 wherein the index data input in said step (j) comprises an identification number identifying the scanned document.

39. A method as claimed in claim 35 wherein the index data input in said step (j) comprises a file path indicating the subdirectory on the server at which the scanned document is to be stored.

40. A method as claimed in claim 35 wherein the index data input in said step (j) comprises text explaining the nature of the scanned document.

41. A method as claimed in claim 35 wherein the index data input in said step (j) identifies a matter to which the scanned document relates.

42. A method as claimed in claim 35 wherein the index data input in said step (j) identifies a transaction to which the scanned document relates.

43. A method as claimed in claim 35, further comprising the step of:

o) adjusting the display of the scanned document via a user's operation of a control element defined by the HTML document displayed by the web browser within the user interface.

44. A method as claimed in claim 43, wherein the adjusting of said step (o) includes increasing the scale of display of the scanned document ("zooming in") on the user interface.

45. A method as claimed in claim 43, wherein the adjusting of said step (o) includes decreasing the scale of the display of the scanned document ("zooming out") on the user interface.

46. A method as claimed in claim 43, wherein the adjusting of said step (o) includes scaling the display of the scanned document to fit within the document display portion of the display of the user interface of the client device.

47. A method as claimed in claim 43, wherein the adjusting of said step (o) includes generating the display of the scanned document on the user interface of the client device with the same scale as the scanned document.

48. A method as claimed in claim 43, further comprising the step of:

p) generating a multiscan mode signal via a user's operation of a control element defined within the web browser of the user interface of the client device, said steps (e)-(g) repeatedly performed to generate document data for a plurality of documents, based on the multimode scan signal.

49. A method as claimed in claim 43, further comprising the steps of:

p) generating a selection signal via a user's operation of a control element defined within the web browser at the client device indicating at least one of the first, last, next and previous scanned documents for display; and a) displaying the document data for one of the scanned documents within the web browser of the client device, based on the selection signal generated in said step (p).

50. A method as claimed in claim 43, wherein the index data includes predetermined identification data to identify the document.

51. A method as claimed in claim 43, wherein the document data and the index data are transmitted in said step (l) between the server and client device in hypertext transfer protocol (HTTP) format.

52. A method as claimed in claim 43, wherein the start scan signal and the send data signal are input by the user with the input device via a common control element defined within the web browser of the user interface that toggles between a first scan mode for the performance of said step (a) and a second send mode for the performance of step (l).

53. A method as claimed in claim 43, wherein the start scan signal is input by the user with the input device via a first control element defined within the web browser of the user interface for a first scan mode in the performance of said step (a), and the send data signal is input by the user with the input device via a second control element defined within the web browser of the user interface in the performance of said step (l).

54. A system for use with at least one document, the system comprising:

a client device including
   a processor;
   a memory coupled to the processor;
   an input device coupled to the processor; and
   a display unit coupled to the processor;
a scanner coupled to the processor; and
at least one server coupled to the processor,
the processor operating under a predetermined control program stored in the memory to generate a display on the display unit based on a hypertext mark-up language (HTML) document stored in the memory, the display generated by the HTML document including a document display portion, an index field portion, and a control portion separately defined in the display, the document display portion displaying document data received from a scanner, the document data generated by scanning the document with the scanner, the index field portion permitting index data to be input by a user via the input device for association with the document data, and the control portion including at least one control element operable by the user with the input device for use in generating at least a start scan signal to initiate scanning of the document with the scanner and for use in generating a send data signal with the input device to transmit the document data with the index data to the server over a network using a destination address from an address field of the display of the client device.

55. A system as claimed in claim 54, wherein the control element alternates between generating the start scan signal and the send data signal between successive activations of the control element by the user with the input device.

56. A system as claimed in claim 54, wherein the control element can be operated by the user with the input device to adjust the scale of the display of the document data.

57. A system as claimed in claim 54, wherein the control element can be operated by the user with the input device to increase the scale of the display of the document data ("zoom in").

58. A system as claimed in claim 54, wherein the control element can be operated by the user with the input device to decrease the scale of the display of the document data ("zoom out").

59. A system as claimed in claim 54, wherein the control element can be operated by the user with the input device to scale the document data to fit within the document display portion of the user interface.

60. A system as claimed in claim 54, wherein the control element can be operated by the user with the input device to scale the document data for display in the document display portion to the same scale as the scanned document.

61. A system as claimed in claim 54, wherein the control element can be operated by the user with the input device to select document data from among a plurality of scanned documents for display on the document display portion of the display.

62. A system as claimed in claim 54, wherein the server receives document data and index data from the client device, the system further comprising:
a database storage unit coupled to the server, the database storage unit being separate from the server, for storing the index data in association with the document data from the processor.

63. A system used to scan a document, the system coupled to a network, the system comprising:
a client device;
a scanner coupled to the client device;
a server coupled to the client device via the network; and
a database storage unit coupled to the server,
the client device receiving document data generated by the scanner by scanning a document, the client device having a user interface capable of generating a display by execution of an hypertext mark-up language (HTML) document stored by the client device, the display including a document display portion, an index field portion, and a control portion separately defined in the display, the document display portion displaying document data received from the scanner, the document data generated by scanning the document in print form with the scanner, the document data representing the scanned document, the index field portion permitting index data to be input by a user via an input device of the client device for association with the document data, and the control portion including at least one control element operated by the user with the input device for use in generating at least a start scan signal with the input device to initiate scanning of the document with the scanner and for use in generating a send data signal with the input device to transmit the document data with the index data to the server over the network using a destination address from an address field of the display, the server storing the document data and index data in the database storage unit.

64. A system as claimed in claim 63, wherein the network includes an internetwork.

65. A system as claimed in claim 63, wherein the client device includes a personal computer.

66. A system as claimed in claim 63, wherein the user interface includes a web browser in which the document data is displayed.

67. A system coupled to a network, the system operated by at least one user, the system comprising:
a plurality of subsystems coupled to the network, the subsystems having respective client devices capable of displaying document data included within respective hypertext mark-up language (HTML) documents displayed on corresponding web browsers thereof, at least one of the subsystems including a scanner coupled to a respective client device, the scanner generating the document data by scanning a document in print form based on a first command from a user entered into the web browser of the client device coupled to the scanner, the client device receiving the document data from the scanner and generating a display of the document data in the web browser thereof, the client device transmitting the document data based on a second command from the user entered into the web browser of the client device;
at least one server coupled to the network, the server receiving the document data from the client device over the network using a destination address specified in an address field of the web browser of the client device; and
a database storage unit coupled to the server, the database storage unit separate from the server, the database storage unit storing the document data so that the subsystems can access the document data.

68. A system as claimed in claim 67, wherein the network includes an internetwork.

69. A method comprising the steps of:
a) generating a display including a display portion with a view of a scanned document within a browser of a client device based on document data derived from a scan of a document in print form;
b) inputting predetermined index data into at least one field of an index field portion of the display within the browser of the client device, the index field portion defined in the display within the browser separately from the display portion;
c) generating a send data signal from within the browser of the client device using a control element of a control portion defined separately from the index field portion and the display portion in the display within the browser;
d) transmitting the document data and index data from the client device to the server over an internetwork with the control element of the control portion using a destination address of a server identified in an address field of the browser in response to the send data signal generated in said step (c);
e) receiving the document data and index data at the server; and
f) storing the document data in association with the index data received from the server in a database of a data storage unit separate from the server.

70. A method as claimed in claim 69 wherein the display of the scanned document is included in a hypertext mark-up language (HTML) document displayed by the browser of the client device's user interface.

71. A method as claimed in claim 70 wherein the send data signal is generated in step (c) by activating a control element defined in the HTML document.

\* \* \* \* \*